United States Patent [19]

Maganias

[11] Patent Number: 4,790,702
[45] Date of Patent: Dec. 13, 1988

[54] NUT AND BOLT ASSEMBLY

[76] Inventor: Nicholas H. Maganias, Reston Medical Bldg., 1715 Club House Rd., Reston, Va. 22090

[21] Appl. No.: 844,938

[22] Filed: Mar. 27, 1986

[51] Int. Cl.⁴ .......................................... F16B 35/04
[52] U.S. Cl. .................................. 411/412; 29/525.1; 403/408.1; 411/417
[58] Field of Search ............... 411/337, 366, 368, 378, 411/411–413, 417, 245, 383–385, 389; 29/526 R; 403/408.1, 358

[56] References Cited

U.S. PATENT DOCUMENTS

| | | | |
|---|---|---|---|
| 381,463 | 4/1888 | Cook | 411/366 |
| 1,750,769 | 3/1930 | Austin | 411/412 X |
| 1,927,780 | 9/1933 | Anderson | 411/337 X |
| 2,409,516 | 10/1946 | Rosenthal et al. | 411/337 |
| 2,460,613 | 2/1949 | Whelan et al. | 411/366 X |
| 2,672,069 | 3/1954 | Mitchell | 411/368 |
| 2,999,706 | 9/1961 | Wilcox | 411/378 X |
| 3,142,239 | 7/1964 | Meixner | 411/411 X |
| 3,426,321 | 2/1969 | Peterson | 411/413 X |
| 3,461,877 | 8/1969 | Morch | 411/411 X |
| 4,373,309 | 2/1983 | Lutz | 411/389 X |

FOREIGN PATENT DOCUMENTS

| | | | |
|---|---|---|---|
| 1207154 | 12/1965 | Fed. Rep. of Germany | 411/337 |
| 1466538 | 12/1966 | France | 411/337 |
| 2287613 | 5/1976 | France | 411/411 |
| 225414 | 5/1943 | Switzerland | 411/366 |
| 324801 | 11/1957 | Switzerland | 411/389 |
| 315813 | 10/1971 | U.S.S.R. | 411/337 |
| 12563 | of 1909 | United Kingdom | 411/337 |
| 1154684 | 6/1969 | United Kingdom | 411/337 |

*Primary Examiner*—Lloyd A. Gall
*Attorney, Agent, or Firm*—Cushman, Darby & Cushman

[57] ABSTRACT

A nut and bolt assembly includes a bolt having at least one external threaded portion and at least one adjacent unthreaded portion along its length and a nut having an internal threaded portion threadedly engageable with the threaded portion of the bolt, the unthreaded portion of the bolt having a diameter such that the nut can slide therealong in an axial direction without rotation and the axial length of the unthreaded portion being at least as great as the threaded portion of the nut, the arrangement being such that in a clamping position of the assembly the threaded portion of the nut wholly resides on the unthreaded bolt portion with one end of the nut threads abutting one end of the threads of the threaded bolt portion.

3 Claims, 1 Drawing Sheet

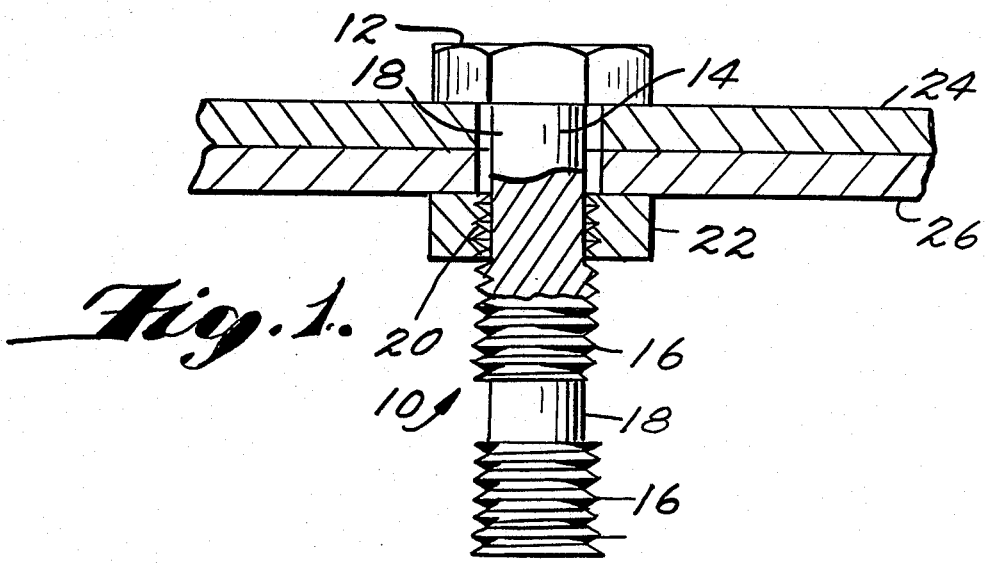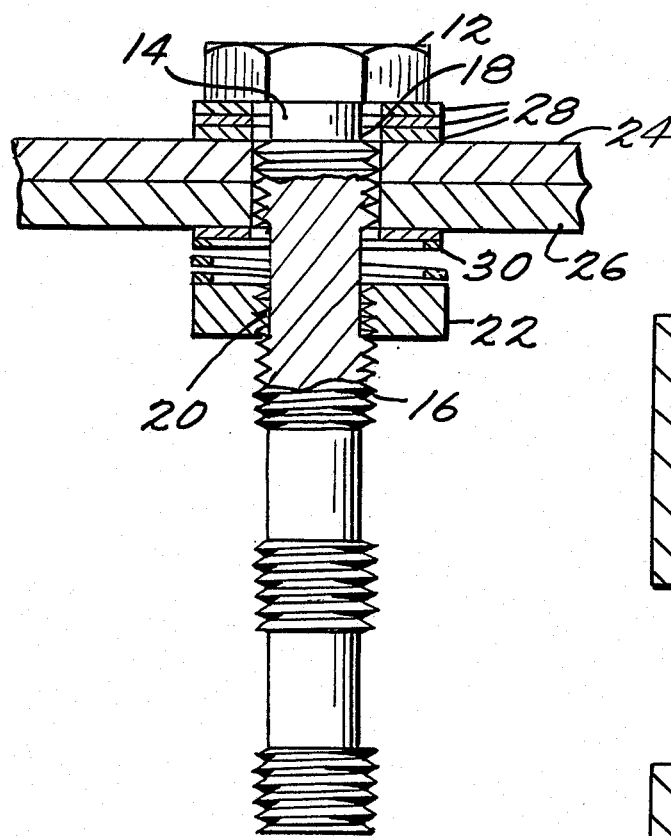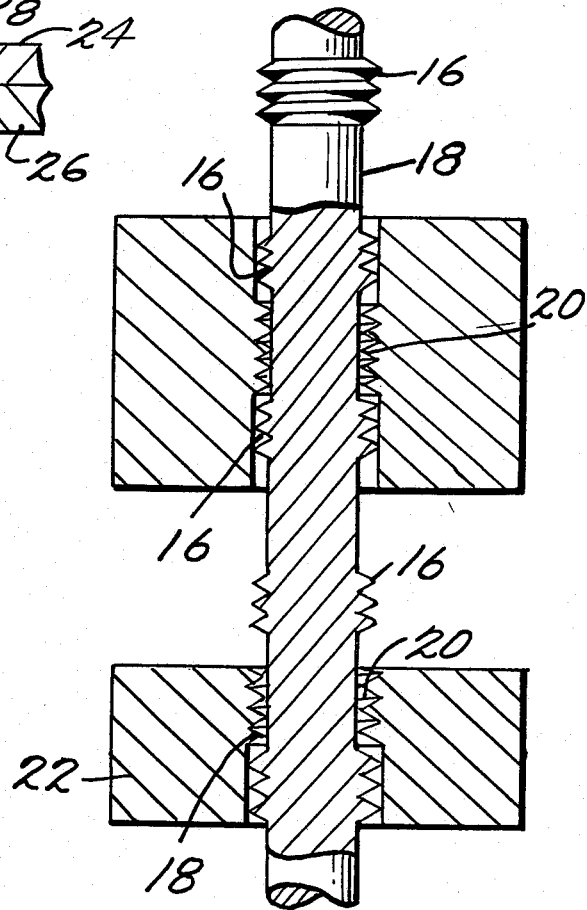

NUT AND BOLT ASSEMBLY

This invention relates to a nut and bolt assembly in which the nut, in its holding or clamping position, is located at an unthreaded bolt portion.

BACKGROUND AND SUMMARY OF THE INVENTION

Bolts having one or more unthreaded portions along their lengths are known per se. Typically the bolt has a plurality of alternate threaded and unthreaded portions along its shank, the purpose of the arrangement being to provide a fast-acting nut and bolt assembly, in the sense that sliding movement of the nut along an unthreaded portion of the bolt shank can take place rapidly and without rotation, so that fewer turns of the nut are required to tighten the nut at its desired operative position on the shank. In its tightened or clamping position the nut is threadedly engaged with the bolt as in conventional nut and bolt assemblies.

In accordance with the present invention the nut and bolt cooperate with each other such that in the clamping or holding position the nut resides at an unthreaded portion of the bolt shank and is not in threaded engagement with any portion of the bolt shank. The advantage of the arrangement is that the nut is less likely to unscrew during use of a joint formed by the nut and bolt assembly than is a conventional nut and bolt assembly. In the latter, any rotation of the nut in an unscrewing direction, as might occur during vibration, is accompanied by essentially immediate loosening of the nut, whereas in the arrangement according to the present invention rotation of the nut in an unscrewing direction does not result in unscrewing of the nut unless and until the nut becomes threadedly engaged with a threaded portion of the bolt shank. Typically, the nut in its operative position will be in axial compression, i.e. clamped tightly between the end of a threaded bolt portion and an element of one of the parts being held in position by the nut and bolt assembly. The invention does not exclude, however, the situation where the nut is relatively loose, in the sense that little or no axial compression is exerted on the nut in its operative or holding position.

BRIEF DESCRIPTION OF THE DRAWINGS

FIG. 1 is an axial sectional view, partly broken away, illustrating a nut and bolt assembly embodying the principles of the present invention; and FIGS. 2 and 3 are axial sectional views, partly broken away, illustrating two other nut and bolt assemblies embodying the principles of the invention.

DETAILED DESCRIPTION

As shown in FIGS. 1, 2 and 3 the bolt 10 includes a head 12, which may be conventional, and a shank 14 which has at least one threaded portion 16 and at least one adjacent unthreaded portion 18 which has a smaller diameter than the threaded portion 16. Typically the bolt 10 will have a plurality of alternate threaded portions 16 and unthreaded portions 18 so that a nut 22 may reside in any of several different axial holding positions.

The axial length of each threaded portion 16 is not critical and may be either greater than or less than the axial dimension of the interiorly threaded portion 20 of the nut 22. The axial length of each unthreaded bolt portion 18 is such that the threaded portion of the nut 22 can occupy an unthreaded portion 18 without also being in threaded engagement with a threaded portion 16. Thus, at least slight axial movement of the nut 22 along an unthreaded bolt portion 18 is possible, and this axial movement can be substantial when the axial length of the unthreaded bolt portion 18 is substantially greater than the axial length of threaded nut portion 20. The nut 22 may be conventional in that the axial dimension of its threaded portion 20 is the same as the thickness of the nut 22, but the threaded portion 20 can be less than the thickness of the nut 22.

FIG. 1 illustrates an assembly in which two plates 24,26 are clamped together by the bolt and nut assembly 10. In this embodiment the under surface of the bolt head 12 abuts the upper surface of the upper plate 24 and the upper surface of the nut 22 abuts the under surface of the lower plate 26. The bolt 10 has two unthreaded portions 18 the uppermost of which is located just below the head 12, and the two plates 24 and 26 as well as the nut 22 reside at the uppermost unthreaded portion. The nut 22 is conventional in that its threaded portion 20 extends along the entire thickness of the nut. The lower end of the threaded nut portion 20 contacts but is not in threaded engagement with the upper end of the uppermost threaded bolt portion 16. In the illustrated embodiment the threaded nut portion 20 is clamped against the threaded bolt portion 16 and the plates 24 and 26 are clamped between the nut 22 and the bolt head 12, these relationships resulting from the relationship between the axial length of the uppermost unthreaded bolt portion 18 and the combined thickness of the plates 24,26 and the nut 22. Clamping engagement of the nut 22 with the part or parts to be held may also be achieved if the assembly of such parts is compressible in the axial dimension of the bolt 10. For example, one or both of the plates 24,26 may be made of compressible material or a layer of compressible material may be provided between the plates, on top of the plate 24 or under the plate 26.

In FIG. 2 two plates 24,26 are again clamped together by the nut and bolt assembly, although in this case washers have been provided to effect a thickness of the clamped elements which will ensure that the threaded nut portion 20 contacts the adjacent threaded bolt portion 16. For example, three rigid washers 28 have been placed between the bolt head 12 and the upper plate 24, and one rigid washer 28 and a spring washer 30 have been placed between the lower plate 26 and the nut 22. The unthreaded bolt portion 18 occupied by the nut 22 is located between two threaded bolt portions in this embodiment.

FIG. 3 illustrates an embodiment in which the threaded nut portions 20 have axial lengths which are less than the thickness of the respective nuts 22. No clamped elements are illustrated in FIG. 3, but it will be appreciated that one or more elements can be disposed between the two nuts 22.

What is claimed is:

1. An assembly of elements comprising at least one member having an unthreaded hole therethrough; a one-piece bolt having a head at one end thereof extending through the hole, the bolt having external a plurality of alternate threaded and unthreaded portions along its length; and a nut having an internal threaded portion which is threadedly engageable with one of the threaded portions of the bolt, the nut having an internal diameter large enough to allow the nut to slide axially along the unthreaded bolt portions and the threaded portion of the nut being no greater than the axial dimension of each unthreaded bolt portion, and the threaded nut portion residing wholly on an unthreaded portion of the bolt, with an axially facing surface of the nut in engagement with said one member and the end of the nut thread remote from said one member abutting the end of the thread of one of the threaded bolt portions whereby the nut is clamped to said one member.

2. An assembly of elements comprising at least one member having an unthreaded hole therethrough; a one-piece bolt extending through the hole, the bolt having external a plurality of alternate threaded and unthreaded portions along its length and having a bolt head at one end and an opposite end which is free of a bolt head; and a nut having an internal threaded portion which is threadedly engageable with one of the threaded portions of the bolt, the nut having an internal diameter large enough to allow the nut to slide axially along the unthreaded bolt portions and the threaded portion of the nut being no greater than the axial dimension of each unthreaded bolt portion, and the threaded nut portion residing wholly on an unthreaded portion of the bolt, with an axially facing surface of the nut in engagement with said one member and the end of the nut thread remote from said one member abutting the end of the thread of one of the threaded bolt portions whereby the nut is clamped to said one member, and the threaded portions of said bolt other than said one threaded portion being free of threaded engagement with a nut.

3. A method of clamping a nut having an internal threaded portion against a member having a hole through which a one-piece bolt shank extends, the bolt shank having a head at one end and a plurality of alternate threaded and unthreaded portions along its length, the diameter of the unthreaded portions being slightly less than the diameter of the threaded portions, the method comprising threadedly engaging the nut with a threaded portion of the bolt shank and effecting relative rotation between the nut and the bolt shank so that the nut travels along the threaded portion and then becomes threadedly disengaged from the threaded portion at which time the nut thread and the thread on the threaded portion abut each other end-to-end and the face of the nut remote from the end-to-end abutment engages said member.

* * * * *